(12) United States Patent
Saitoh et al.

(10) Patent No.: US 9,644,944 B2
(45) Date of Patent: May 9, 2017

(54) METHOD AND DEVICE FOR MEASURING POLISHING AMOUNT OF OPTICAL FIBER COMPONENT

(71) Applicant: TOYO SEIKAN GROUP HOLDINGS, LTD., Tokyo (JP)

(72) Inventors: Toshihide Saitoh, Kanagawa (JP); Yasunori Senno, Kanagawa (JP)

(73) Assignee: TOYO SEIKAN GROUP HOLDINGS, LTD., Tokyo (JP)

(*) Notice: Subject to any disclaimer, the term of this patent is extended or adjusted under 35 U.S.C. 154(b) by 0 days.

(21) Appl. No.: 14/442,845

(22) PCT Filed: Dec. 13, 2012

(86) PCT No.: PCT/JP2012/082408
§ 371 (c)(1),
(2) Date: May 14, 2015

(87) PCT Pub. No.: WO2014/091610
PCT Pub. Date: Jun. 19, 2014

(65) Prior Publication Data
US 2015/0285617 A1    Oct. 8, 2015

(51) Int. Cl.
*G01B 11/02* (2006.01)
*B24B 19/22* (2006.01)
(Continued)

(52) U.S. Cl.
CPC ........... *G01B 11/02* (2013.01); *B24B 19/226* (2013.01); *B24B 49/12* (2013.01);
(Continued)

(58) Field of Classification Search
CPC ............ G01B 9/02028; G01B 9/02027; B24B 37/013
(Continued)

(56) References Cited

U.S. PATENT DOCUMENTS 5,541,730 A * 7/1996 Chaney .............. G01B 9/02004
356/482
5,657,405 A * 8/1997 Fujiwara ................ G01D 5/268
356/225

(Continued)

FOREIGN PATENT DOCUMENTS

CN    1768285    5/2006
CN    102684045   9/2012
(Continued)

OTHER PUBLICATIONS

Chinese Office Action issued Oct. 10, 2015 in corresponding Chinese Patent Application No. 201280076917.9 (English Translation).

(Continued)

*Primary Examiner* — Joseph J Hail
*Assistant Examiner* — J Stephen Taylor
(74) *Attorney, Agent, or Firm* — Wenderoth, Lind & Ponack, L.L.P.

(57) ABSTRACT

The polishing amount of an optical fiber component can be measured directly, accurately and easily in a real-time mode during polishing, regardless of the polishing amount of a ferrule. Provided is a method for measuring the polishing amount of an optical fiber component while performing polishing, the method including: branching an inspection light among a reference optical path having a variable optical path length, an optical fiber component being measured, and a comparison optical path, and determining a polishing amount of the optical fiber component by a change amount of a difference Lc between a reference optical path length when return light of the reference optical path interferes with return light of the optical fiber component being measured and a reference optical path length when the return (Continued)

light of the reference optical path interferes with return light of the comparison optical path.

8 Claims, 5 Drawing Sheets

(51) Int. Cl.
   *B24B 49/12* (2006.01)
   *G01M 11/08* (2006.01)
   *G01B 9/02* (2006.01)
   *G01M 11/00* (2006.01)
   *G02B 6/38* (2006.01)

(52) U.S. Cl.
   CPC ....... *G01B 9/02091* (2013.01); *G01M 11/088* (2013.01); *G01M 11/31* (2013.01); *G02B 6/385* (2013.01); *G02B 6/3863* (2013.01)

(58) Field of Classification Search
   USPC ................. 451/6, 9, 10, 11, 41; 65/378, 485
   See application file for complete search history.

(56) References Cited

U.S. PATENT DOCUMENTS

| | | | | |
|---|---|---|---|---|
| 6,331,081 | B1* | 12/2001 | Ohtsuka | G02B 6/2552 385/51 |
| 6,488,567 | B1* | 12/2002 | Flanders | B24B 19/226 451/287 |
| 6,741,337 | B2* | 5/2004 | Katakura | B24B 19/226 356/73.1 |
| 6,829,411 | B2* | 12/2004 | Easley | G02B 6/262 385/31 |
| 7,346,236 | B2* | 3/2008 | Asano | G02B 6/2551 385/34 |
| 7,446,881 | B2* | 11/2008 | Suzuki | G01B 11/0675 356/479 |
| 7,909,817 | B2* | 3/2011 | Griffin | A61B 18/22 606/13 |
| 2003/0004412 | A1 | 1/2003 | Izatt et al. | |
| 2003/0235374 | A1 | 12/2003 | Luther et al. | |
| 2004/0101255 | A1 | 5/2004 | Dean, Jr. et al. | |
| 2005/0069256 | A1 | 3/2005 | Jennings et al. | |
| 2006/0018605 | A1 | 1/2006 | Luther et al. | |
| 2006/0077394 | A1* | 4/2006 | Suzuki | G01J 5/0003 356/479 |
| 2006/0103850 | A1* | 5/2006 | Alphonse | A61B 5/0066 356/479 |

FOREIGN PATENT DOCUMENTS

| | | |
|---|---|---|
| JP | 7-181007 | 7/1995 |
| JP | 7-243818 | 9/1995 |
| JP | 7-251363 | 10/1995 |
| JP | 11-84141 | 3/1999 |
| JP | 2001-91223 | 4/2001 |
| JP | 2001-116518 | 4/2001 |
| JP | 2002-372604 | 12/2002 |
| JP | 2005-165016 | 6/2005 |
| JP | 2006-194679 | 7/2006 |
| WO | 98/40772 | 9/1998 |
| WO | 02/062525 | 8/2002 |
| WO | 2004/001474 | 12/2003 |
| WO | 2011/096200 | 8/2011 |

OTHER PUBLICATIONS

Extended European Search Report issued Feb. 19, 2016 in European Application No. 12890076.8.

Office Action issued Mar. 9, 2016 in European Application No. 12890076.8.

Koji Kajiwara et al., "Multiplexing of Long-Length Fiber Bragg Grating Distributed Sensors Based on Synthesis of Optical Coherence Function", IEEE Photonics Technology Letters, vol. 23, No. 21, Nov. 1, 2011.

H. Müller et al., "Optical fibers with interferometric path length stability by controlled heating for transmission of optical signals and as components in frequency standards", Applied Physics B, Lasers and Optics, 84, pp. 401-408, 2006.

International Search Report issued Feb. 19, 2013 in International (PCT) Application No. PCT/JP2012/082408.

Decision to Grant a Patent issued Mar. 29, 2013 in Japanese Application No. 2013-509374.

Decision to Grant a Patent issued Jun. 4, 2015 in Korean Application No. 10-2015-7009748, with English translation.

Communication under Rule 71(3) issued Sep. 13, 2016 in European patent application No. 12 890 076.8.

* cited by examiner

METHOD AND DEVICE FOR MEASURING POLISHING AMOUNT OF OPTICAL FIBER COMPONENT

TECHNICAL FIELD

The present invention relates to a method and a device capable of measuring a polishing amount of an optical fiber component, such as a component obtained by welding a lens fiber, an end cap, or the like, to an optical fiber tip, while conducting polishing, and more particularly to a method and a device using OCT (Optical Coherence Tomography).

BACKGROUND ART

The polishing amount of an optical fiber component is typically measured by inserting a tip portion of the optical fiber component into a ferrule, polishing with a polishing machine such as disclosed in Patent Literature 1 and 2, and estimating the measured polishing amount of the ferrule as the polishing amount of the optical fiber component.

Figure 7:
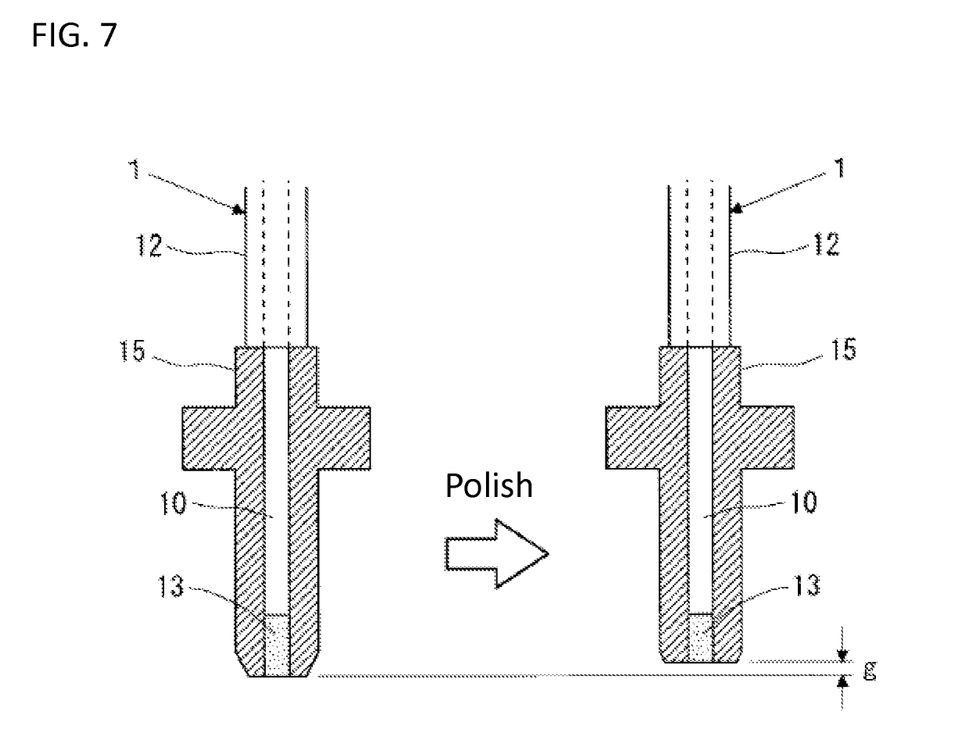
FIG. 7 is an explanatory drawing illustrating the conventional method for measuring the polishing amount of an optical fiber component.

FIG. 7 is an explanatory drawing illustrating the polishing of an optical fiber component 1 inserted into a ferrule 15. The optical fiber component is obtained, for example, by welding an end cap 13 to the tip of an optical fiber 10. The left side of FIG. 7 illustrates a state before the polishing in which the ferrule tip is aligned with the tip of the optical fiber component 1 (tip of the end cap 13). Where the polishing is performed as depicted on the right side of FIG. 7, the measured polishing amount g of the ferrule is taken as the polishing amount of the optical fiber component 1. The reference numeral 12 in the figure stands for a coating of the optical fiber 10.

RELATED ART LITERATURE

Patent Literature

Patent Literature 1: Japanese Patent Application Publication No. H11-84141
Patent Literature 2: Japanese Patent Application Publication No. 2005-165016

SUMMARY OF THE INVENTION

Technical Problem

The above-described method requires that the tip portion of the ferrule 15 and the tip portion of the optical fiber component 1 be aligned. This is because where the tip portions are not aligned, the polishing amount of the ferrule 15 becomes different from the polishing amount of the optical fiber component 1. Accordingly, when the optical fiber component 1 is inserted into the ferrule 15, the tip portion of the ferrule 15 and the tip portion of the optical fiber component 1 are aligned such that the difference therebetween is, for example, less than 0.5 μm. Such an alignment is a difficult and time-consuming operation.

It is an objective of the present invention to enable direct, accurate and easy real-time measurements of a change in the length (that is, the polishing amount) of an optical fiber component during polishing, regardless of the polishing amount of a ferrule, make it unnecessary to align the tip portion of the ferrule 15 with the tip portion of the fiber component 1 when the optical fiber component is inserted into the ferrule, and increase the operation efficiency.

Solution to Problem

Figure 1:
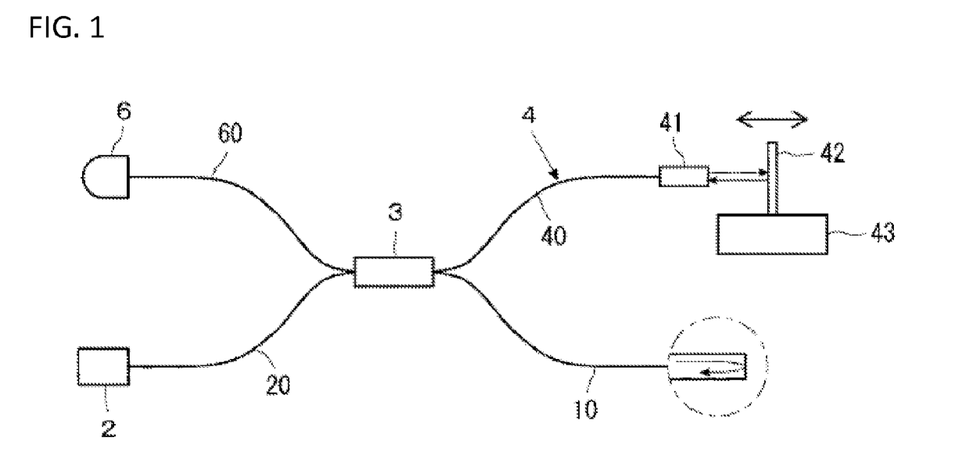
FIG. 1 is an explanatory drawing illustrating a method for measuring the length of an optical fiber using an OCT.

FIG. 1 is an explanatory drawing illustrating the case in which the length (total length) of the optical fiber 10 is measured using the OCT. A light source 2 and a light receiver 6 are connected to one end side of a fiber coupler 3, which is a brancher of the optical fiber, through an optical fiber 20 and an optical fiber 60, respectively, and the optical fiber 10 which is to be measured (measuring object) and a reference optical path 4 are connected to the other end side.

The reference optical path 4 has an optical fiber 40, a lens 41 connected to the tip thereof, a mirror 42 facing the lens 41, and a mirror moving device 43. The lens 41 serves for obtaining a substantially parallel beam from the emitted light of the optical fiber 40. The mirror moving device 43 is an optical path length change unit that moves the mirror 42 attached thereto and changes the optical path length of the reference optical path 4. The position information on the mirror in the mirror moving device is transmitted to the light receiver 6.

The light emitted from the light source 2 is branched by the fiber coupler 3, one branched light enters the optical fiber 10 being measured, and the other branched light enters the reference optical path 4. The light that has entered the optical fiber 10 being measured is reflected at the tip surface thereof, and the return light thereof reaches the light receiver 6 through the fiber coupler 3 and the optical fiber 60. The light that has entered the reference optical path 4 passes through the optical fiber 40 and is emitted as a substantially parallel beam from the lens 41 at the tip and reflected by the mirror 42. The return light thereof reaches the light receiver 6 through the lens 41, the optical fiber 40, the fiber coupler 3, and the optical fiber 60.

The light receiver 6 receives the return light of the optical fiber 10 being measured and the return light of the reference optical path 4 and detects the length of the optical fiber 10 by the position of the mirror 42 when the two rays of return light interfere (when the light intensity peaks). Since the length of the optical fiber 10 is equal to the length of the reference optical path 4 when the two rays of return light interfere, where the length of the optical fiber 40 and the lens 41 is measured in advance, the length of the optical fiber 10 can be measured by acquiring the position information on the mirror 42 at the time of interference.

When the length (total length) of the same optical fiber was actually measured multiple times by the method illustrated by FIG. 1, the measuring values were spread within a range of about 15 μm. This is supposedly because a large number of metal components are used for the member fixing the lens 41 and the mirror moving device 43 in the reference optical path 4, those metal components undergo expansion or contraction due to changes in room temperature or other temperature changes, and the reference optical path length changes.

Assuming that the temperature does not change at all, the polishing amount can be determined in a real time mode by measuring the change in the total length of the optical fiber which is being measured, but in order to realize such a state, the polishing needs to be performed in a thermostat or with the temperature control in the mirror moving device (for example, control using a Peltier element), and such a method for measuring the polishing amount of an optical fiber component can hardly be considered as a high-utility method.

Figure 2:
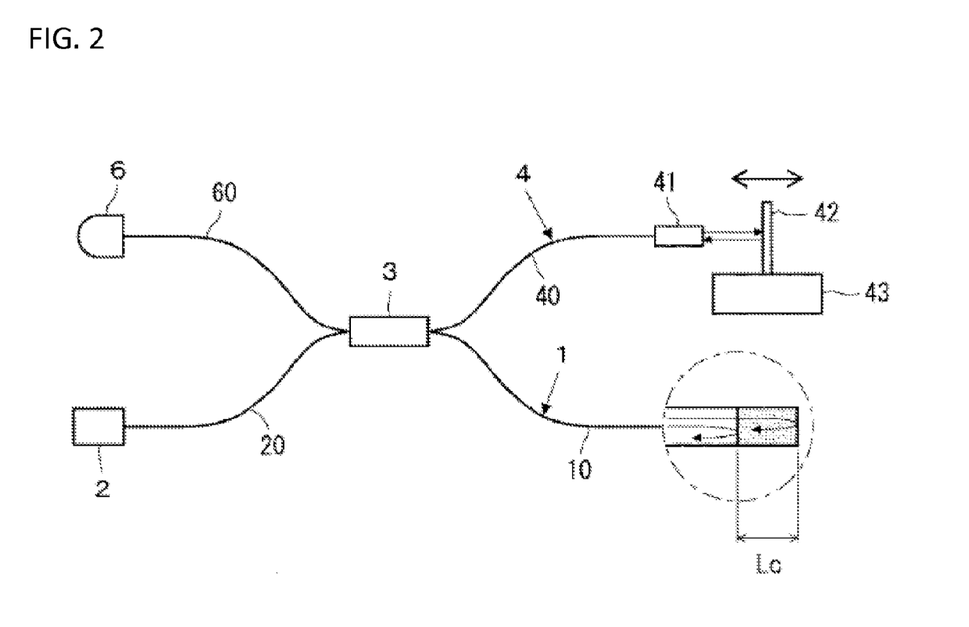
FIG. 2 is an explanatory drawing illustrating a method for measuring the length of the tip portion of the optical fiber component using an OCT.
Figure 5A:
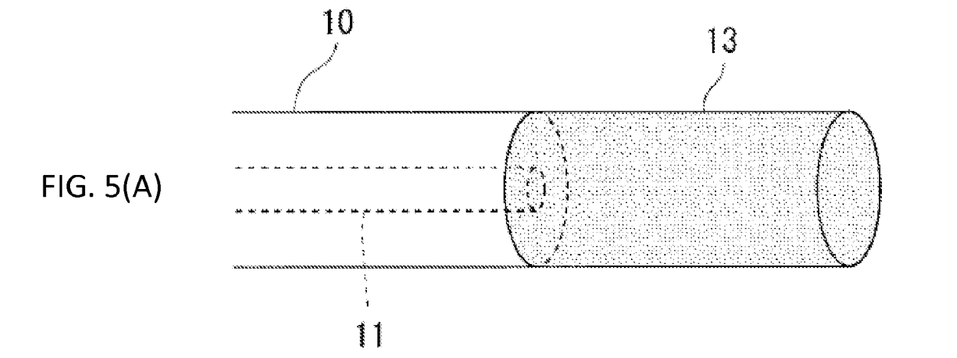
FIG. 5 is an explanatory drawing illustrating an example of an optical fiber component.

FIG. 2 is an explanatory drawing illustrating a tip portion length measuring method for the optical fiber component 1 using the OCT. This method is identical to that illustrated by FIG. 1, except that the optical fiber component 1 being measured is attached instead of the optical fiber 10 being measured which is depicted in FIG. 1. In this case, the optical fiber component 1 is obtained by connecting an end cap 13 as a tip portion to the optical fiber 10, as depicted in FIG. 5(A). The specific feature of this configuration is that the optical fiber component is produced such that the light is also reflected at the boundary surface of the optical fiber 10 and the end cap 13. The reference numeral 11 in FIG. 5 denotes an optical fiber core.

Part of the light that has been branched by the fiber coupler 3 and entered the optical fiber component 1 being measured is reflected at the boundary surface of the optical fiber 10 and the end cap 13, and the return light reaches the light receiver 6 through the fiber coupler 3 and the optical fiber 60. The length La of the optical fiber 10 (length to the boundary surface) can be measured by the method illustrated by FIG. 1 on the basis of this return light and the return light of the reference optical path.

Further, part of the light that has been branched by the fiber coupler 3 and entered the optical fiber component 1 being measured is transmitted by the boundary surface of the optical fiber 10 and the end cap 13 and reflected by the tip surface of the end cap 13, and the return light thereof reaches the light receiver 6 through the optical fiber 10, the fiber coupler 3, and the optical fiber 60. The total length (total length of the optical fiber 10 and the end cap 13) Lb of the optical fiber component 1 can be measured by the method illustrated by FIG. 1 on the basis of this return light and the return light of the reference optical path.

Therefore, the length Lc (=Lb−La) obtained by subtracting the length La of the optical fiber 10 from the total length Lb of the optical fiber component 1 becomes the length of the end cap 13.

The lengths La and Lb have a spread within a range of about 15 μm, which is caused by temperature changes, in the same manner as in the case illustrated by FIG. 1, but since the effect of the measuring error caused by temperature changes is the same in La and Lb, the error in the length Lc (=Lb−La) is eliminated and an accurate value is obtained.

When the length Lc of the end cap 13 of the optical fiber component 1 was actually repeatedly measured multiple times by the method illustrated by FIG. 2, the measuring value was within a range of less than ±0.5 μm.

Further, since Lc is the difference (difference in the reference optical path length) between the mirror position when the return light of the reference optical path 4 interferes with the return light reflected from the tip surface of the end cap 13 and the mirror position when the return light of the reference optical path 4 interferes with the boundary surface reflection return light, it is not always necessary to measure the La and Lb, and the Lc can be determined by the difference in the mirror positions (difference in the reference optical path length).

Where the length Lc of the end cap 13 is measured while polishing the optical fiber component 1, the reduction amount of Lc, that is, the polishing amount, is obtained.

The specific feature of the configuration depicted in FIG. 2, is that the optical fiber component 1 is fabricated such that the light is also reflected at the boundary surface of the optical fiber 10 and the end cap 13. However, the actual optical fiber components are required to be free of loss on the boundary surface of the optical fiber and the end cap, and where the optical fiber and the end cap are correctly connected by welding and practically no light is reflected on the boundary surface, the length Lc of the end cap cannot be determined by the method illustrated by FIG. 2.

The present invention provides a method for measuring a polishing amount of an optical fiber component while performing polishing, the method including: branching an inspection light among a reference optical path having a variable optical path length, an optical fiber component being measured, and a comparison optical path, and determining a polishing amount of the optical fiber component by a change amount of a difference Lc between a reference optical path length when return light of the reference optical path interferes with return light of the optical fiber component being measured and a reference optical path length when the return light of the reference optical path interferes with return light of the comparison optical path.

In the present invention, the return light of the comparison optical path is used instead of the return light from the boundary surface depicted in FIG. 2, and the difference Lc in length between the optical fiber component and the comparison optical path can be measured with a high accuracy by the difference (difference in reference optical path length) Lc between the mirror position when the return light of the reference optical path 4 and the return light reflected from the tip surface of the end cap 13 interfere with each other, and the mirror position when the return light of the reference optical path 4 and the return light of the comparison optical path interfere with each other.

Where the Lc is measured while polishing the optical fiber component, since the length of the comparison optical path is constant, the reduction amount of Lc becomes the polishing amount of the optical fiber component.

The present invention also provides the method for measuring a polishing amount of an optical fiber component, wherein the optical fiber component is obtained by welding an end cap to an optical fiber tip.

In the present invention, the optical fiber component which is the measuring object can be configured by welding the tip of an optical fiber to an end cap.

A variety of optical fibers, such as a single-mode optical fiber, a multiple-mode optical fiber, and a polarization-maintaining optical fiber (PMF) can be used. The end cap is a coreless silica glass fiber. FIG. 5(A) illustrates an example of such an optical fiber component in which a round columnar end cap 13 is welded to the tip of a single-mode optical fiber (SMF) 10.

The present invention also provides the method for measuring a polishing amount of an optical fiber component, wherein the optical fiber component is obtained by welding a lens fiber to an optical fiber tip.

In the present invention, the optical fiber component which is the measuring object can be configured by welding a lens fiber to an optical fiber tip.

Figure 5B:
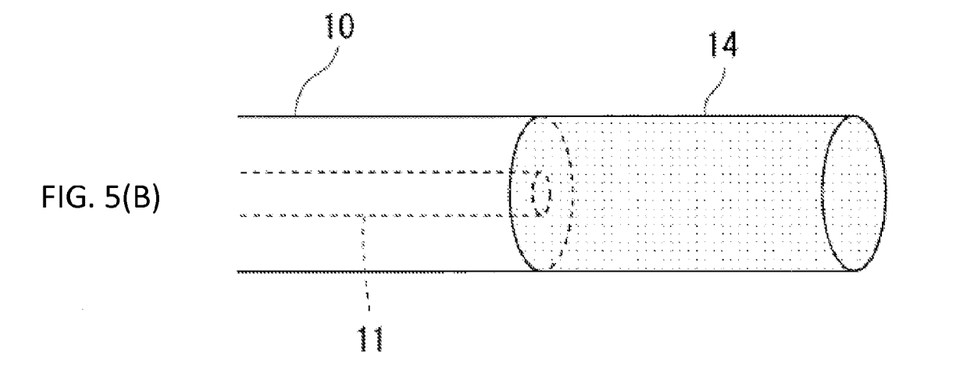

A variety of optical fibers, such as a single-mode optical fiber, a multiple-mode optical fiber, and a polarization-maintaining optical fiber (PMF) can be used. The lens fiber is, for example, a GRIN lens (Graded Index Lens) which is a distributed-index lens of a round columnar shape. FIG. 5(B) illustrates an example of such an optical fiber component in which a round columnar lens fiber 14 (GRIN lens) is welded to the tip of the single-mode optical fiber (SMF) 10.

The present invention also provides the method for measuring a polishing amount of an optical fiber component, wherein the inspection light is branched among a reference optical path having a variable optical path length, a plurality of optical fiber components being measured, and a comparison optical path, and a polishing amount is determined by a change amount of the Lc with respect to each optical fiber component being measured.

In the present invention, the polishing amount can be measured with respect to each optical fiber component while polishing a plurality of optical fiber components at the same time.

The present invention also provides a device for measuring a polishing amount of an optical fiber component, including:

a light source of inspection light;

a brancer that branches the inspection light among a reference optical path having a variable optical path length, an optical fiber component being measured, and a comparison optical path; and a light receiver that receives return light of the reference optical path, the optical fiber component being measured, and the comparison optical path, wherein the light receiver determines a polishing amount of the optical fiber component by a change amount of a difference Lc between a reference optical path length when return light of the reference optical path interferes with return light of the optical fiber component being measured and a reference optical path length when the return light of the reference optical path interferes with return light of the comparison optical path.

The present invention also provides the device for measuring a polishing amount of an optical fiber component, wherein the optical fiber component is obtained by welding an end cap to an optical fiber tip.

The present invention also provides the device for measuring a polishing amount of an optical fiber component, wherein the optical fiber component is obtained by welding a lens fiber to an optical fiber tip.

The present invention also provides the device for measuring a polishing amount of an optical fiber component, wherein the brancher branches the inspection light among a reference optical path having a variable optical path length, a plurality of optical fiber components being measured, and a comparison optical path, and the light receiver determines a polishing amount by a change amount of the Lc with respect to each optical fiber component being measured.

Advantageous Effects of Invention

The method for measuring a polishing amount of an optical fiber component in accordance with the present invention enables direct, accurate and easy measurements of the polishing amount of an optical fiber component, regardless of the polishing amount of a ferrule. Therefore, it is unnecessary to align the tip portion of the ferrule with the tip portion of the fiber component when the optical fiber component is inserted into the ferrule, and the operation efficiency can be increased.

The method for measuring a polishing amount of an optical fiber component in accordance with the present invention can be easily implemented with the device for measuring a polishing amount of an optical fiber component in accordance with the present invention.

DESCRIPTION OF EMBODIMENTS

Figure 3:
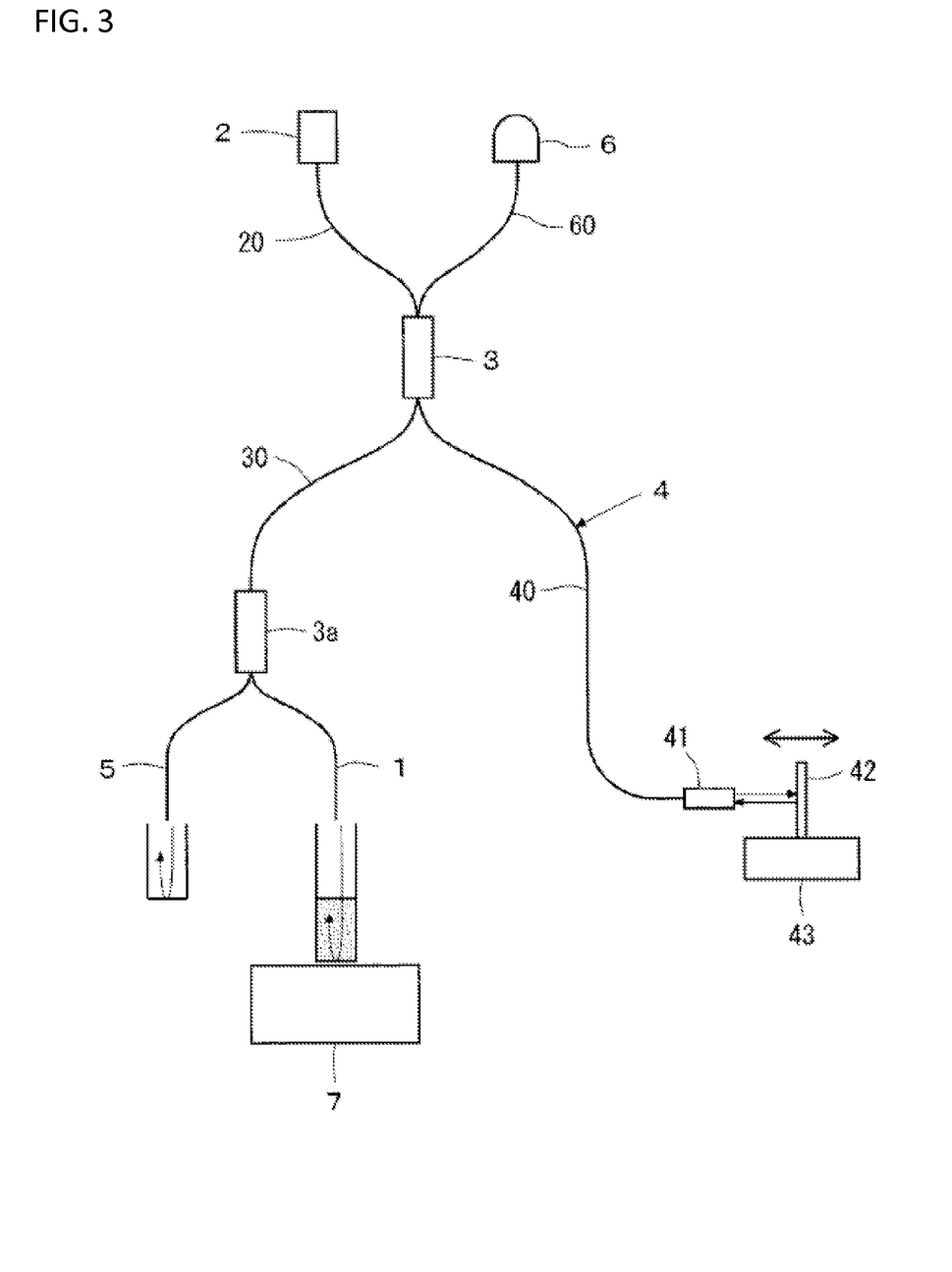
FIG. 3 is an explanatory drawing illustrating the method and device for measuring the polishing amount of an optical fiber component in accordance with the present invention.

FIG. 3 is an explanatory drawing illustrating the method and device for measuring the polishing amount of an optical fiber component in accordance with the present invention.

The device includes a light source 2 for inspection light, a reference optical path 4 with a variable optical path length, a comparison optical path 5, an inspection light brancher, and an optical fiber component 1 being measured which is the measuring object.

The light source 2 and a light receiver 6 are connected to one end side of a fiber coupler 3 through an optical fiber 20 and an optical fiber 60, respectively. A fiber coupler 3a is connected through an optical fiber 30, and the reference optical path 4 is connected to the other end side. The optical fiber component 1 being measured (measuring object) and the comparison optical path 5 are connected to the other end side of the fiber coupler 3a.

A variety of light sources of the inspection light can be used. For example, a 1310 nm SLD (Super Luminescent Diode) light source can be used.

The brancher is the coupler 3 and the fiber coupler 3a connected thereto by the optical fiber 30.

The reference optical path 4 has an optical fiber 40, a lens 41 provided at the tip thereof, and an optical path length change unit. The optical path length change unit has a mirror 42 which is mounted on a mirror moving device 43 and faces the lens 41, and the length of the reference optical path 4 is changed by moving the mirror 42 with the moving device 43 in the direction of approaching the lens 41 and withdrawing therefrom. The mirror 42 is moved at all times during the measurements.

Position information on the mirror in the mirror moving device 43 is transmitted to the light receiver 6.

The comparison optical path 5 has a constant length, and no restriction is placed thereon, provided that the return light is generated. For example, a single-mode optical fiber can be used.

The light receiver 6 is provided with a light receiving element that receives return light from the reference optical path 4, the optical fiber component 1 being measured, and the comparison optical path 5. The light receiver also includes a device (microcomputer) that determines a change amount of the difference Lc between the length of the reference optical path 4 when the return light of the reference optical path 4 interferes with the return light of the optical fiber component 1 being measured and the length of the reference optical path 4 when the return light of the reference optical path 4 interferes with the return light of the comparison optical path 5, that is, the polishing amount of the optical fiber component 1. The length of the reference optical path 4 is obtained from the mirror position information transmitted from the mirror moving device 43.

The light emitted from the light source 2 is branched by the fiber coupler 3, and part thereof passes through the optical fiber 30 to the fiber coupler 3a and is branched therein. One branched part enters the optical fiber component 1 being measured, and the other branched part enters the comparison optical path 5 (optical fiber). The light that has entered the optical fiber component 1 being measured is reflected at the tip surface thereof, and the return light thereof reaches the light receiver 6 through the fiber coupler 3a, the optical fiber 30, the fiber coupler 3, and the optical fiber 60. The light that has entered the comparison optical path 5 (optical fiber) is reflected at the tip of the comparison optical path 5, and the return light thereof reaches the light receiver 6 through the fiber coupler 3a, the optical fiber 30, the fiber coupler 3, and the optical fiber 60.

The light that has been branched by the fiber coupler 3 and has entered the reference optical path 4 is emitted as a substantially parallel beam from the lens 41 at the tip of the optical fiber 40 and reflected by the mirror 42. The return light thereof reaches the light receiver 6 through the lens 41, the optical fiber 40, the fiber coupler 3, and the optical fiber 60.

The light receiver 6 can accurately measure the difference Lc in length between the optical fiber component 1 and the comparison optical path 5 by determining the difference Lc (difference in the length of the reference optical path 4) between the position of the mirror 42 when the return light of the reference optical path 4 and the return light reflected from the tip surface of the optical fiber component 1 which is being measured interfere and the position of the mirror 42 when the return light of the reference optical path 4 and the return light of the comparison optical path 5 interfere. Where the Lc is measured while the optical fiber component 1 is polished with the polishing machine 7, since the length of the comparison optical path is constant, the decrease amount of Lc becomes the polishing amount of the optical fiber component 1.

Figure 4:
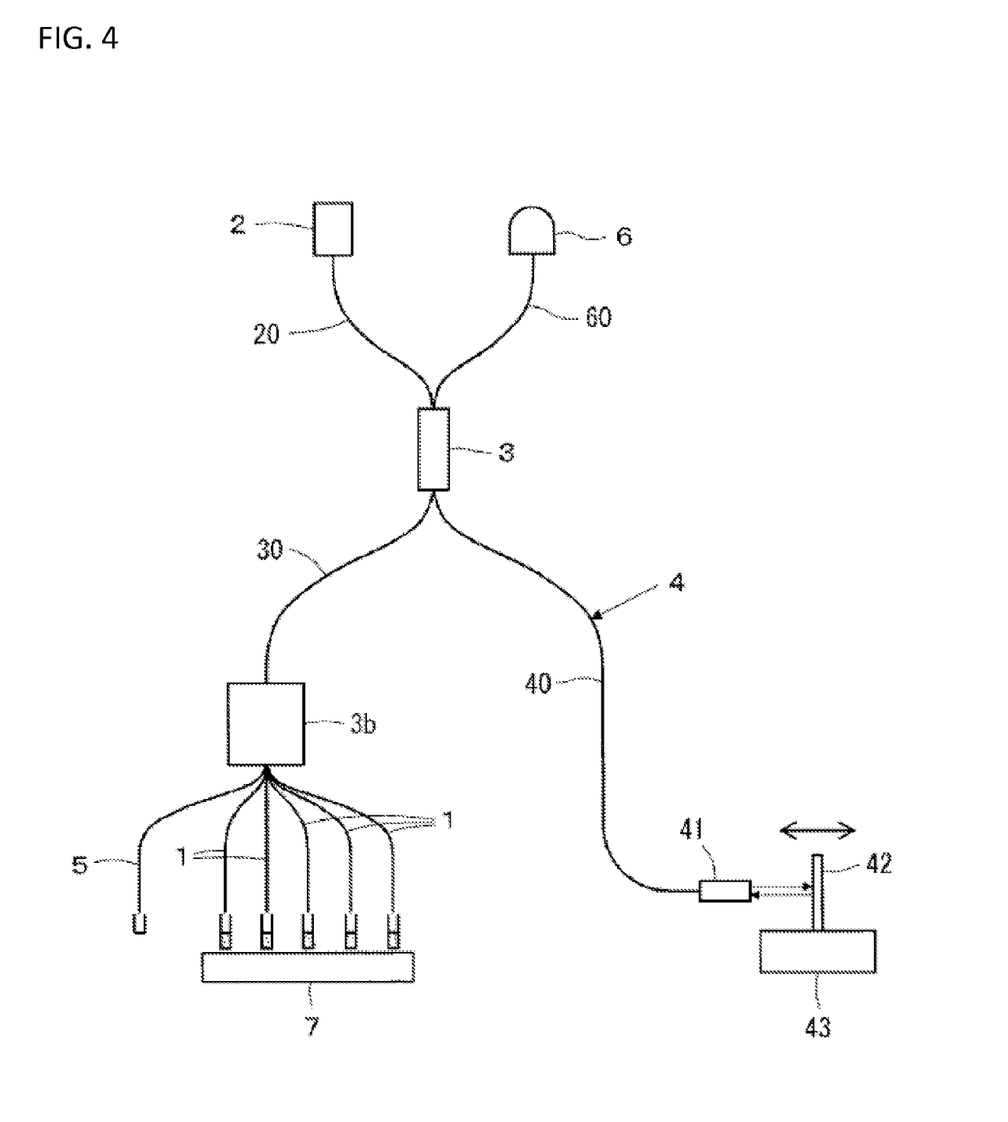
FIG. 4 is an explanatory drawing illustrating the method and device for measuring the polishing amount of an optical fiber component in accordance with the present invention.

FIG. 4 is an explanatory drawing illustrating the method and device for measuring the polishing amount of an optical fiber component in accordance with the present invention.

In FIG. 4, the fiber coupler 3a depicted in FIG. 3 is replaced with a channel selector 3b, and a plurality of optical fiber components 1 being measured and one comparison optical path 5 are connected to the channel selector 3b.

In FIG. 4, the light emitted from the light source 2 is branched by the fiber coupler 3, and part thereof passes through the optical fiber 30 to the channel selector 3b and is branched therein. The branched light enters the plurality of optical fiber components 1 being measured, and the other branched part enters the single comparison optical path 5 (optical fiber). The light that has entered the plurality of optical fiber components 1 being measured is reflected at the tip surface thereof, and the return light thereof reaches the light receiver 6 through the channel selector 3b, the optical fiber 30, the fiber coupler 3, and the optical fiber 60. The light that has entered the comparison optical path 5 (optical fiber) is reflected at the tip of the comparison optical path 5, and the return light thereof reaches the light receiver 6 through the channel selector 3b, the optical fiber 30, the fiber coupler 3, and the optical fiber 60.

The light that has been branched by the fiber coupler 3 and has entered the reference optical path 4 is emitted as a substantially parallel beam from the lens 41 at the tip of the optical fiber 40 and reflected by the mirror 42. The return light thereof reaches the light receiver 6 through the lens 41, the optical fiber 40, the fiber coupler 3, and the optical fiber 60.

The light receiver 6 can accurately measure the difference Lc in length between the optical fiber component 1 and the comparison optical path 5 by the difference (difference in the length of the reference optical path 4) Lc between the position of the mirror 42 when the return light of the reference optical path 4 and the return light reflected from the tip surface of each optical fiber component 1 which is being measured interfere and the position of the mirror 42 when the return light of the reference optical path 4 and the return light of the comparison optical path 5 interfere. Where the Lc is measured while the plurality of optical fiber components 1 is polished with the polishing machine 7, since the length of the comparison optical path is constant, the decrease amount of Lc in each optical fiber component becomes the polishing amount of each optical fiber component 1.

Thus, with the measuring method and device depicted in FIG. 4, the polishing amount of each optical fiber component can be measured in a real-time mode when a plurality of optical fiber components is measured at the same time.

Figure 6:
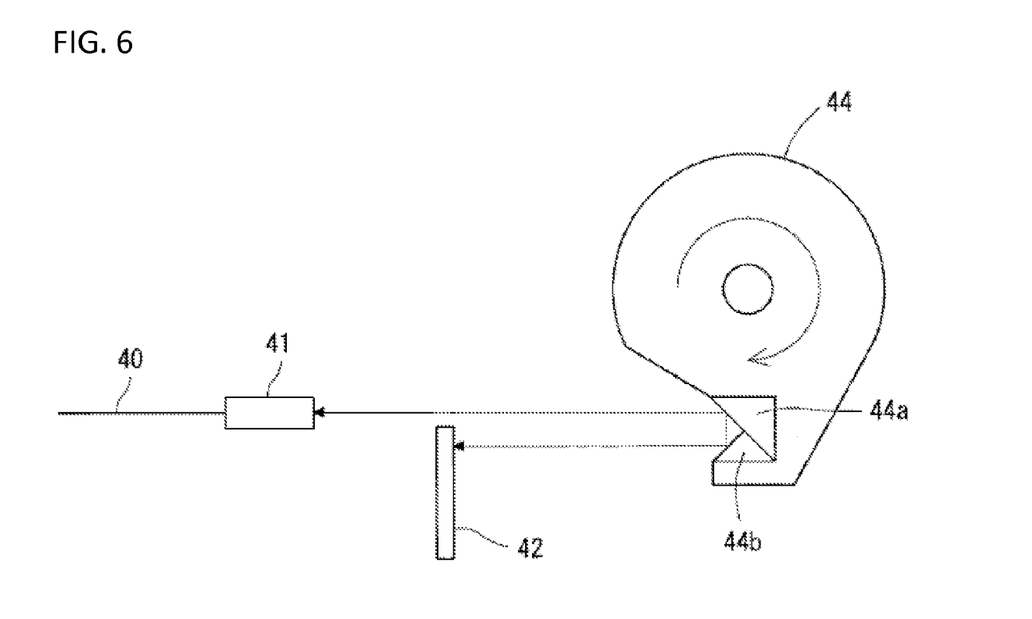
FIG. 6 is an explanatory drawing illustrating another example of the optical path length change unit for the reference optical path.

FIG. 6 illustrates another example of the optical path length change unit in the reference optical path.

The optical path length change unit depicted in FIG. 6 has a mirror 42 and a rotor 44. The rotor 44 has a pair of mirrors 44a, 44b, which is provided at a right angle to each other, and rotates as indicated by an arrow. The light emitted from the lens 41 is reflected by the mirrors 44a, 44b and then reflected by the mirror 42 to produce the return light which is reflected by the mirrors 44b, 44a and falls on the lens 41. Where the rotor 44 is rotated, the optical path length from the lens 41 to the mirror 42 changes, and the optical path length of the reference optical path changes.

INDUSTRIAL APPLICABILITY

The optical fiber component that can be measured in accordance with the present invention is not limited to that depicted in FIG. 5, and includes all of the components for which the light reflected by the tip surface is the return light. The optical fiber component in accordance with the present invention is also inclusive of an independent optical fiber which is not connected at the tip, an independent optical fiber with an oblique tip shape or PC (Physical Contact) shape, and an end cap or a lens product, and the polishing amount thereof can be measured in accordance with the present invention.

The present invention uses TD-OCT (time domain system) among the OCT techniques, the advantage thereof being the possibility of using a large number of techniques in the field of optical communication. For example, as for a light source, a 1310 nm SLD light source can be used and an inexpensive device configuration can be realized. Such a configuration is, however, not limiting, and SS-OCT (frequency sweeping system), which has been used in medicine or the like, and other systems can be also used.

REFERENCE SIGNS LIST 1 optical fiber component
10 optical fiber
11 core
12 coating
13 end cap
14 lens fiber 15 ferrule
2 light source
3 fiber coupler
3a fiber coupler
3b channel selector
30 optical fiber
4 reference optical path
40 optical fiber
41 lens
42 mirror
43 mirror moving device
44 rotor
44a mirror
44b mirror
5 comparison optical path
6 light receiver
7 polishing machine

What is claimed is:

1. A method for measuring a polishing amount of an optical fiber component, the method comprising:
   branching an inspection light among a reference optical path having a variable optical path length, an optical fiber component being measured, and a comparison optical path, and
   while performing polishing of the optical fiber component, determining a polishing amount of the optical fiber component by a change amount of a difference Lc between a reference optical path length when return light of the reference optical path interferes with return light of the optical fiber component being measured and a reference optical path length when the return light of the reference optical path interferes with return light of the comparison optical path.

2. The method for measuring a polishing amount of an optical fiber component according to claim 1, wherein the optical fiber component is obtained by welding an end cap to an optical fiber tip.

3. The method for measuring a polishing amount of an optical fiber component according to claim 1, wherein the optical fiber component is obtained by welding a lens fiber to an optical fiber tip.

4. The method for measuring a polishing amount of an optical fiber component according to claim 1, wherein the inspection light is branched among a reference optical path having a variable optical path length, a plurality of optical fiber components being measured, and a comparison optical path, and a polishing amount is determined by a change amount of the Lc with respect to each optical fiber component being measured.

5. A method for measuring a polishing amount of an optical fiber component, comprising:
   while performing polishing of the optical fiber component, generating inspection light with a light source;
   selectively varying an optical path length of a reference optical path along the reference optical path by an optical path length varying device;
   branching, with a brancher, the inspection light among a reference optical path having a variable optical path length, the optical fiber component being measured, and a comparison optical path;
   receiving, with a light receiver optically coupled to the brancher, return light of the reference optical path, the optical fiber component being measured, and the comparison optical path; and
   calculating with a microcomputer:
      a first optical path length of the reference optical path varied by the optical path length varying device so as to cause the return light of the reference optical path to interfere with the return light of the optical fiber component being measured,
      a second optical path length of the reference optical path varied by the optical path length varying device so as to cause the return light of the reference optical path to interfere with the return light of the comparison optical path, and
      a change amount of a difference between the first optical path length and the second optical path length as a polishing amount of the optical fiber component.

6. The method for measuring a polishing amount of an optical fiber component according to claim 5, wherein the optical fiber component is obtained by welding an end cap to an optical fiber tip.

7. The method for measuring a polishing amount of an optical fiber component according to claim 5, wherein the optical fiber component is obtained by welding a lens fiber to an optical fiber tip.

8. The method for measuring a polishing amount of an optical fiber component according to claim 5, further comprising:
   branching, with the brancher, the inspection light among the reference optical path having a variable optical path length, a plurality of optical fiber components being measured, and the comparison optical path, and
   calculating, with the microcomputer, the first optical path length that causes the return light of the reference optical path to interfere with the return light of each of the plural optical fiber components, respectively, and a difference between each of the first optical path lengths, respectively, and the second optical path length, as the polishing amounts of each of the plural optical fiber components, respectively.

* * * * *